(12) United States Patent
Takano et al.

(10) Patent No.: US 7,102,263 B2
(45) Date of Patent: Sep. 5, 2006

(54) PERMANENT MAGNET TYPE ROTOR AND PERMANENT MAGNET TYPE ROTARY ELECTRICAL MACHINE

(75) Inventors: Tadashi Takano, Shuuchi-gun (JP); Hideaki Takahashi, Shuuchi-gun (JP); Susumu Ando, Shuuchi-gun (JP)

(73) Assignee: Kabushiki Kaisha Moric, Morimachi (JP)

( * ) Notice: Subject to any disclaimer, the term of this patent is extended or adjusted under 35 U.S.C. 154(b) by 862 days.

(21) Appl. No.: 09/683,286

(22) Filed: Dec. 10, 2001

(65) Prior Publication Data
US 2002/0074887 A1    Jun. 20, 2002

(30) Foreign Application Priority Data
Dec. 20, 2000  (JP) ............................. 2000-387361
Nov. 9, 2001   (JP) ............................. 2001-344656

(51) Int. Cl.
*H02K 21/12*    (2006.01)
(52) U.S. Cl. .................. 310/156.53; 310/193
(58) Field of Classification Search ..............................
310/156.01–156.84, 179, 193
See application file for complete search history.

(56) References Cited
U.S. PATENT DOCUMENTS

| | | | |
|---|---|---|---|
| 4,713,569 A | 12/1987 | Schwartz | 310/152 |
| 4,752,707 A | 6/1988 | Morrill | 310/184 |
| 4,769,567 A | 9/1988 | Kurauchi et al. | 310/156 |
| 4,774,428 A * | 9/1988 | Konecny | 310/198 |
| 5,107,159 A * | 4/1992 | Kordik | 310/156.44 |
| 5,444,316 A | 8/1995 | Ohya et al. | 310/494 R |
| 5,610,464 A | 3/1997 | Asano et al. | 310/156 |
| 5,886,440 A | 3/1999 | Hasebe et al. | 310/156 |
| 5,900,687 A * | 5/1999 | Kondo et al. | 310/71 |
| 6,081,058 A * | 6/2000 | Suzuki et al. | 310/156.45 |

FOREIGN PATENT DOCUMENTS

| | | |
|---|---|---|
| DE | 41 33 723 A | 4/1993 |
| DE | 199 20 309 | 11/1999 |

* cited by examiner

*Primary Examiner*—Dang Le
(74) *Attorney, Agent, or Firm*—Ernest A. Beutler

(57) ABSTRACT

A number of embodiments of rotating electrical machines using permanent magnets wherein the cogging torque is substantially reduced as are vibrations caused by magnetic flux variations. This is accomplished by disposing the coil windings in equal circumferential spacing and disposing the associated permanent magnets in non-symmetrical relationship so that the gaps between some of the magnets are different. In addition, the coil windings are such that no two coils of any phase are immediately adjacent each other in a circumferential direction. A method for calculating the optimum spacing is also disclosed.

5 Claims, 22 Drawing Sheets

FIG. 2
(Prior Art)
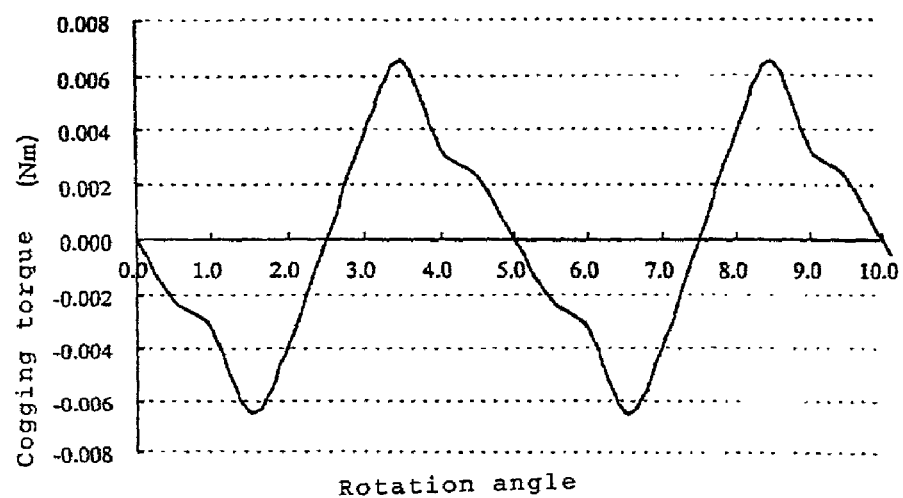
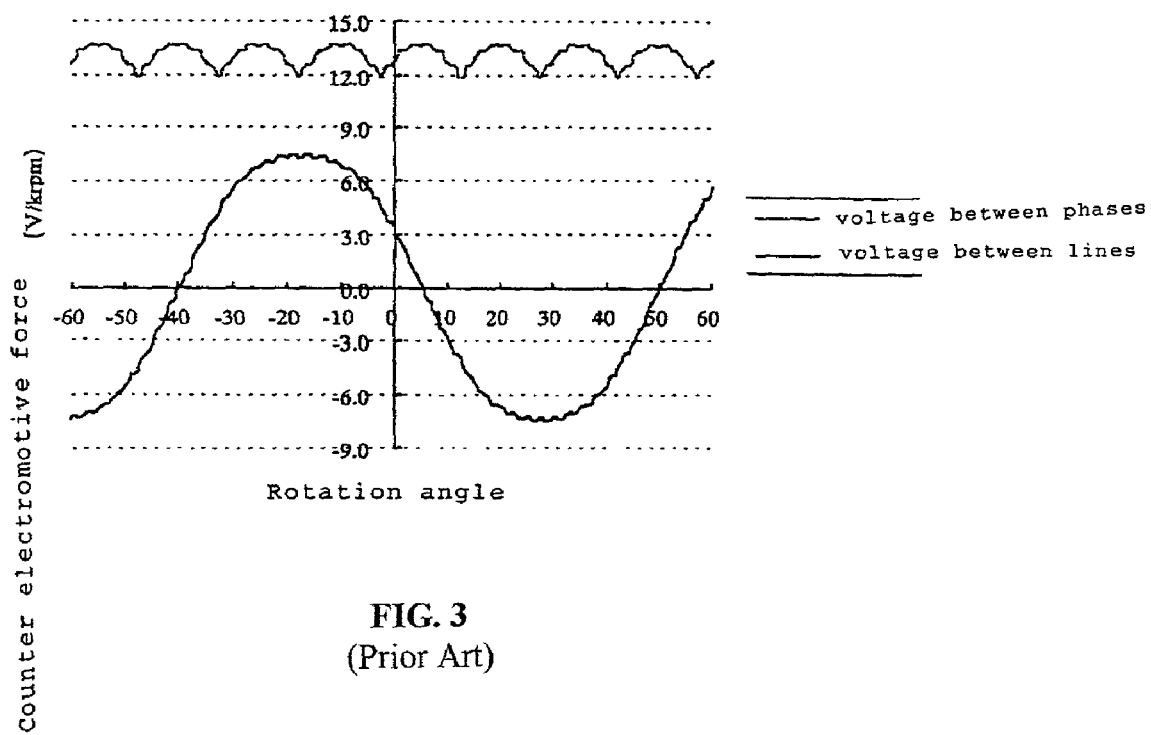
FIG. 3
(Prior Art)

FIG. 6
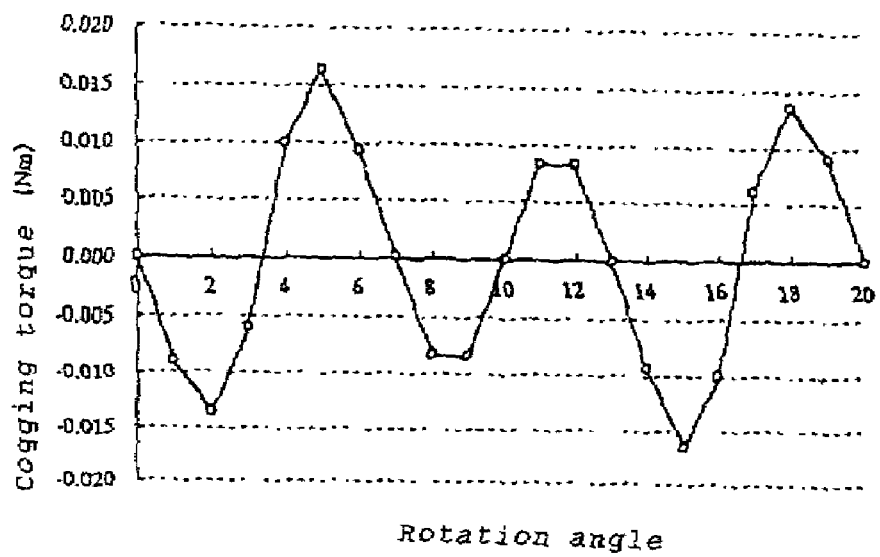
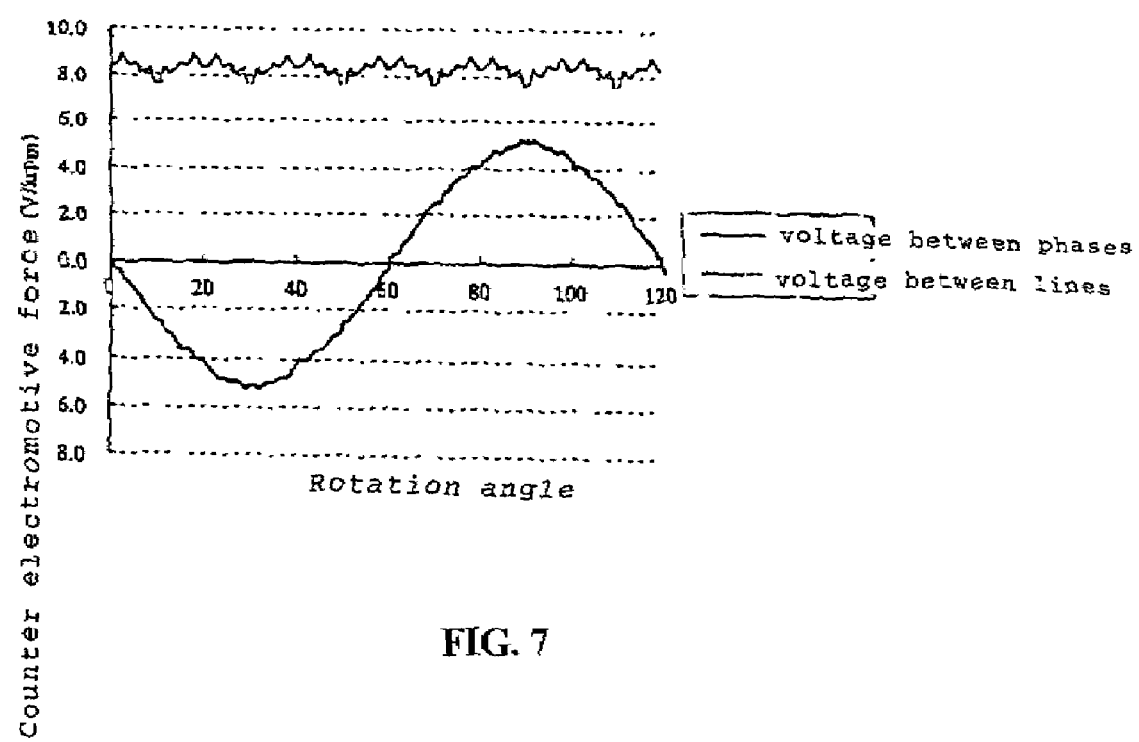
FIG. 7

FIG. 10
(Prior Art)
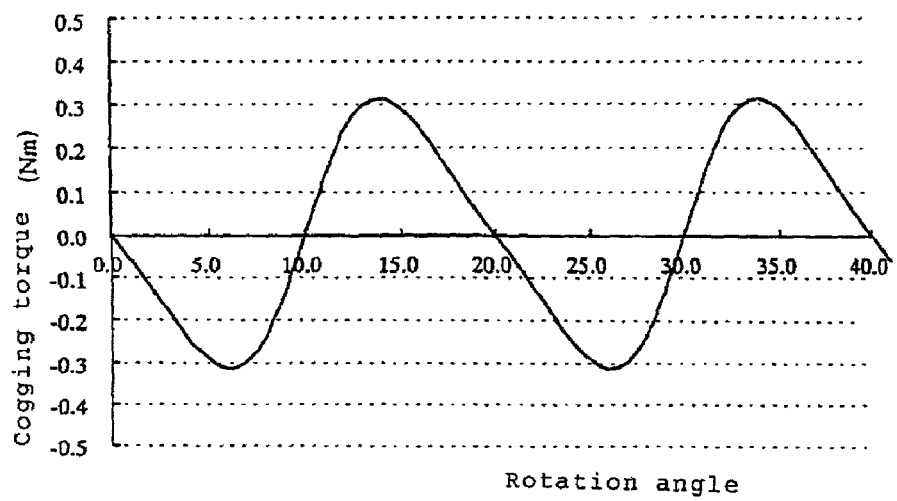
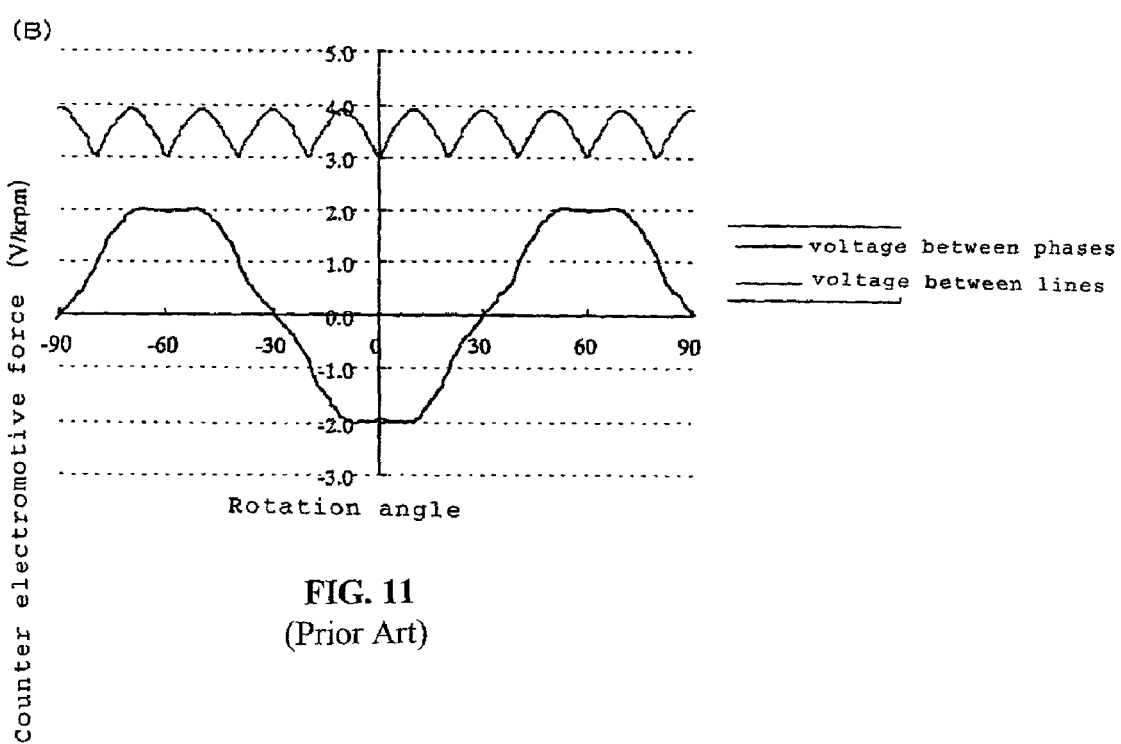
FIG. 11
(Prior Art)

Chart of magnetic flux lines convex shape, SPM (6p-9s)

FIG. 19
(Prior Art)
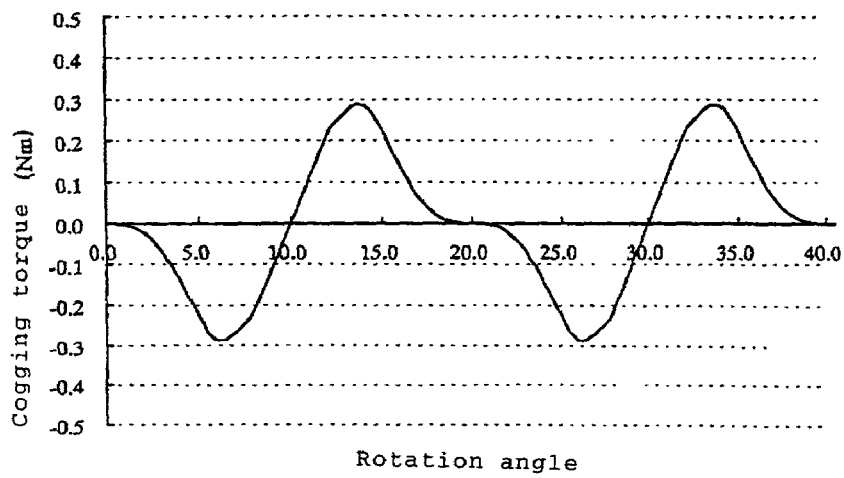
(B)
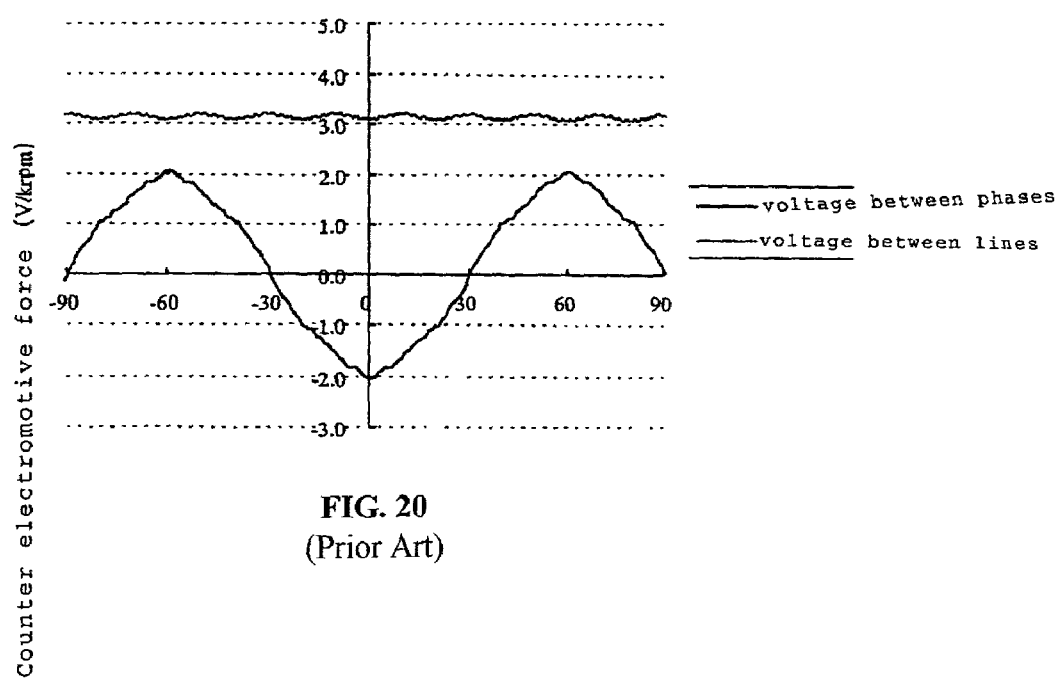
FIG. 20
(Prior Art)

PERMANENT MAGNET TYPE ROTOR AND PERMANENT MAGNET TYPE ROTARY ELECTRICAL MACHINE

BACKGROUND OF INVENTION

This invention relates to a rotating electrical machine of the type that employs permanent magnets and cooperating coil windings wound around armature cores in confronting relationship to the permanent magnets.

A wide variety of types of electrical machines have been provided of the type mentioned in the preceding paragraph. These arrangements may be used as either motors or generators and either the magnets or the coil or both may rotate. If the device is an electrical motor, the windings are selectively energized so as to effect rotation. If the device operates as a generator, the relatively rotatable member is rotated and an electrical current is induced in the windings.

In conventional constructions of this type, the permanent magnets are disposed at circumferentially spaced even intervals with their polarity oppositely arranged. The electrical windings are formed on armature poles formed by a member that defines slots between it. The armature poles are also mounted at circumferentially spaced regular intervals.

With this type of mechanism, it is desirable to insure that the torque required to rotate the rotatable member without large power input is important. The torque necessary to achieve this rotation is referred to as "cogging torque". If the cogging torque is large and the device is a generator, it requires large power to drive the mechanism and this increases the vibration. If the device operates as a motor and has high cogging torque, large power is consumed when idling and this also increases the vibration.

Basically, the cogging torque is related to the number of peak pulses in the coil windings per revolution of the rotor, referred to as the "cogging number". The cogging number is generally equal to the least common multiplier of the number of slots and the number of magnetic poles. The cogging torque is basically proportional to the reciprocal of the square of the cogging number.

In addition, the multiple armature cores generally have the coils wound in coil groups or phases. In a conventional type mechanism, the coils of each phase are disposed adjacent to each other and are oppositely wound. This has the disadvantage of causing unbalanced magnetic forces, which can cause vibration and, in addition to the objectionable noise, premature wear of the bearings of the machine.

These disadvantages of the prior art structure may be best understood by reference to FIGS. 1 through 4, which show a prior art type of eight (8) pole nine (9) slot machine. FIG. 1 illustrates the winding of a prior art electrical motor or generator. FIG. 2 shows the cogging torque in relationship to the rotational angle. FIG. 3 which shows the counter EMF both between lines and phases. FIG. 4 which is a diagrammatic view showing the flux lines during a portion of the rotation of this machine.

In the illustrated embodiment, the machine includes a rotor, indicated generally by the reference numeral 21 which is comprised of a disk having a plurality of permanent magnets 22 fixed thereto around its periphery and which is affixed to a rotor shaft 23. The magnets 22 are formed from a ferromagnetic material, which is assembled to the disk and mounted on the shaft 23, and the magnetic material permanently magnetized. The assembly is bonded together with a resin.

A cooperating armature 24 has a plurality of armature cores that are separated by gaps or slots 25. These gaps or slots 25 are equally spaced around the circumference and around the axis of rotation of the rotor shaft 23.

Although the structure is described in conjunction with an arrangement with rotating magnets and fixed coil windings, the arrangement can obviously be reversed wherein the magnets are held against rotation and the coil windings rotate.

The armature cores that define the slots 25 are divided into groups, in this embodiment, these comprise three groups, having individual adjacent windings UUU, VVV, and WWW, respectively. Individual windings 26U, 26V and 26W are wound around the adjacent cores in opposite directions. As a result, the magnetic flux is such that it is unbalanced because of the fact that the adjacent windings of the coil phases are wound in opposite directions as to increase the magnetic flux as shown in FIG. 4.

The example shown employs nine slots and eight magnetic poles and thus, has a cogging number of 72 i.e. 9×8. Thus, although this type of mechanism provides a low cogging torque as seen in FIG. 2 and a fairly uniform counter electromotive force as shown in FIG. 3, it results in vibrations and the total power output is not as great due to the fact that the coils operate in sequence and thus, tend to negate each other under some circumstances as will be apparent later in describing a comparison between the invention and prior art structures as thus far described.

It is, therefore, a principal object to this invention to provide an improved rotating electrical machine that incorporates permanent magnets and in which the cogging torque is maintained at a low value while vibrations and electrical power output are significantly improved.

It is a further object to this invention to provide an arrangement wherein the power output can be increased and the driving force decreased without adversely affecting the cogging torque.

The vibrational effect may be reduced by decreasing the number of magnets to, for example 6. The cogging number then decreases to 18. Then, however, the cogging torque becomes unacceptably large. Another way in which the vibrational problem may be reduced is by providing a series of magnets which are skewed relative to each other in side-by-side fashion and which cooperate with the coil windings. This type of mechanism is very difficult to manufacture and in fact cannot be manufactured by high production volume techniques.

Therefore, it is a principal object to this invention also to provide an improved and simplified rotating electrical machine that can be manufactured on high speed assembly apparatus and which will have the desired performance.

SUMMARY OF INVENTION

A first feature of this invention is adapted to be embodied in a permanent magnet type rotary electrical machine having a rotor and a stator. One of the rotor and stator comprises a plurality of permanent magnets disposed such that the plurality of eight adjacent magnets are different from each other. The other of the rotor and the stator comprise a plurality of electrical coils wound around cores juxtaposed to the permanent magnets for cooperation therewith. In accordance with this feature of the invention, the coil windings are arranged in groups or phases having their windings connected to each other with common ends. No two coil windings of each group or phase are circumferentially adjacent to each other.

Another feature of the invention is also adapted to be embodied in a permanent magnet type rotary electrical machine having a rotor and a stator and permanent magnets and coil windings around cores. In accordance with this feature of the invention, one of the cores and permanent magnets are disposed in non-symmetrical relationship to the axis of rotation of the rotor.

BRIEF DESCRIPTION OF DRAWINGS

FIG. 2 is a graphical view showing the cogging torque in neutron meters per degree of angle of rotation of the rotor with the prior art construction.

FIG. 3 is a graphical view showing the counter electromotive force in relationship to rotational angle both with respect to the phases and the individual coil winding lines of the prior art type of construction.

FIG. 6 is a graphical view showing the cogging torque per degree of rotation of the rotor.

FIG. 7 is a graphical view showing the counter electromagnetic force in accordance with the invention and voltage between phases and between lines.

FIG. 10 is a graphical view showing the cogging torque of another prior art arrangement wherein the magnets have a different configuration then that shown in FIG. 9.

FIG. 11 is a graphical view showing the cogging torque in neutron meters per degree of angle of rotation of the rotor with the prior art construction shown in FIG. 12.

FIG. 19 is a graphical view showing the cogging torque in neutron meters per degree of angle of rotation of the rotor with this yet another prior art construction.

FIG. 20 is a graphical view showing the counter electromotive force in relationship to rotational angle both with respect to the phases and the individual coil winding lines of this yet another prior art construction.

DETAILED DESCRIPTION

Figure 5:
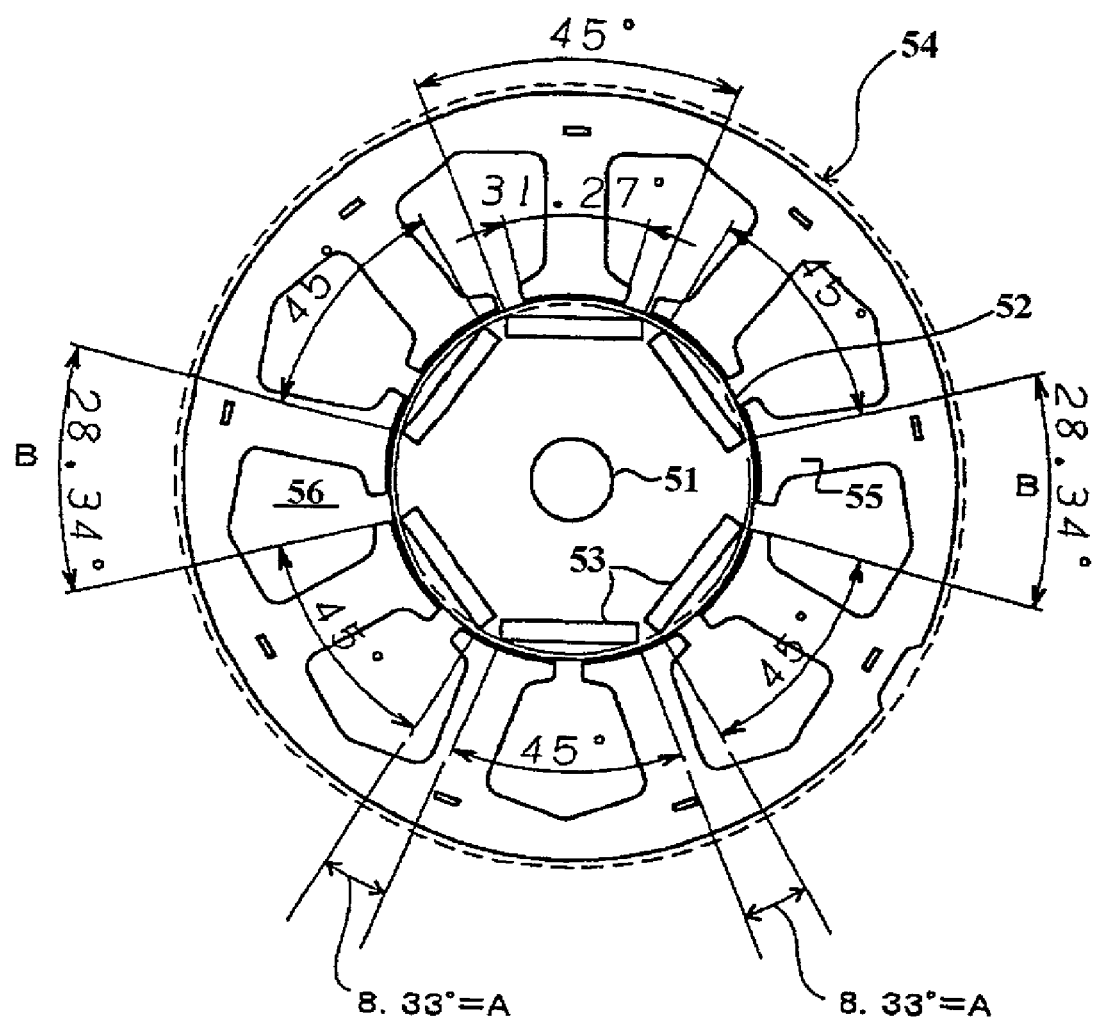
FIG. 5 is a view in part similar to FIG. 1 of a rotating electrical machine constructed in accordance with a first embodiment of the invention without the coil windings.
Figure 8:
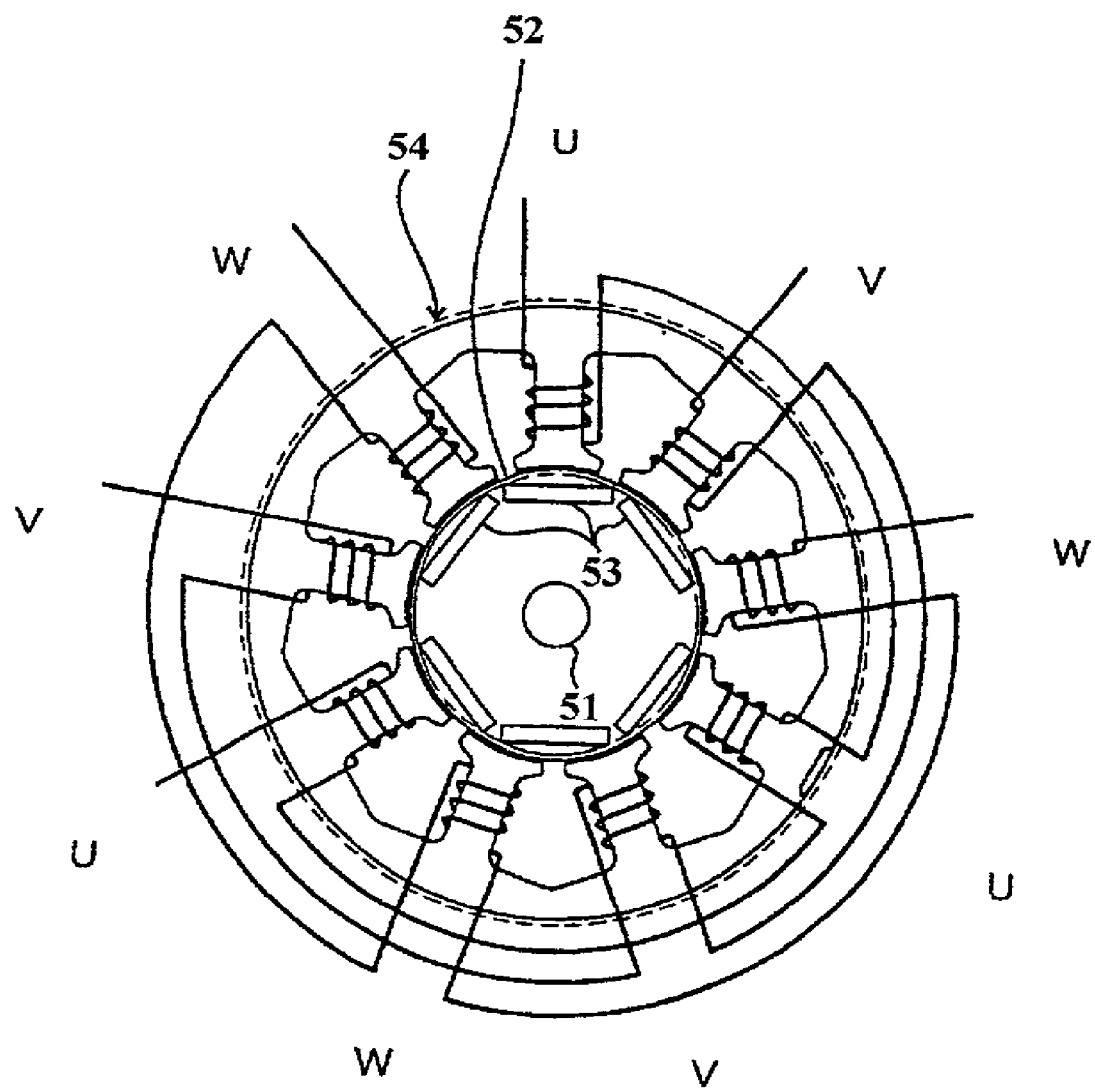
FIG. 8 is a view, in part similar to FIG. 5, but showing the coil windings.

Referring first to the embodiment of FIGS. 5 through 8 and initially to FIGS. 5 and 8, a rotating electrical machine constructed in accordance with this embodiment is illustrated and includes a rotor that is comprised of a rotor shaft 51 to which is fixed in a conventional manner, a disk 52 into which the periphery of eight permanent magnets 53 having a flat planar shape are embedded. After assembly, the magnetic material of the plates 53 is permanently magnetized and this type of rotor is referred to as an "IPM"(Interior Permanent Magnet) type. The width of each of the permanent magnets 53 is equal to 45° in this embodiment.

These permanent magnets 53 cooperate with an armature, indicated generally by the reference numeral 54, which is provided with a plurality of armature poles 55 that define slots 56 there between. There are nine armature poles 55 and slots 56 and these are equally spaced.

As may be seen in FIG. 8, the device is of the three-phase type but unlike prior art type of constructions, each phase consisting of the armatures U, V and W is wired such that no two windings of the same phase are disposed adjacent to each other.

In this embodiment, the permanent magnets 53 are arranged in two groups of three. The spacing between adjacent magnets of each group is, in this embodiment, equal to 8.33° indicated at the dimension "A" in FIG. 5. However, the spacing between the two groups is considerably greater and specifically 28.34° as indicated by the dimension "B" in FIG. 5. The circumferential extent of the tips of the cores or teeth 55 extends through an arc of 31.27° in this embodiment.

Figure 9:
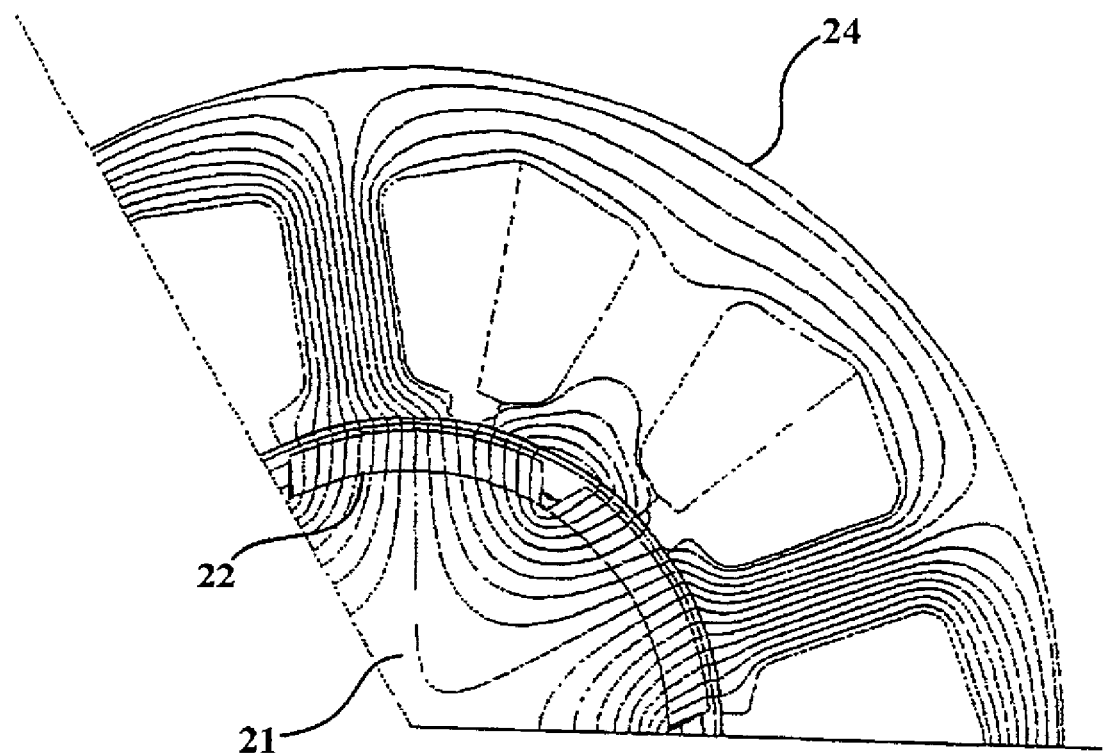
FIG. 9 is a graphical view showing the flux lines in a prior art arrangement.

Thus, as may be seen in FIG. 6 the cogging torque, although slightly greater than a conventional type machine, is more uniform and the counter electromotive force is more uniform. Furthermore, as a result of this arrangement, the magnetic flux lines, as seen in FIG. 9, are much more balanced and vibrations are substantially reduced. Also, because of the fact that the end phase coils are displaced from each other by 120°, noise is decreased as is vibration and the life of the bearings is prolonged. Furthermore, this structure can be manufactured quite easily and the use of plate-like magnets permits a much lower costs without decreasing the efficiency of the machine.

The improvement of the embodiment over the prior art type of constructions is further emphasized by FIGS. 9–20. These figures show various magnet configurations utilizing prior art type of constructions having six poles and nine slot constructions with the coil windings being phased as shown in the prior art constructions of FIGS. 1–4. In other words, these figures show back-to-back comparisons between Applicants' invention and various types of prior art constructions employing permanent magnets on a six pole, nine slot arrangement.

For example, FIG. 9 shows the flux lines for an arrangement having arcuate shape permanent magnets, indicated by the reference numeral 22 in this embodiment with the other components being identified by the same reference numerals utilized in the prior art construction.

As may be seen, the cogging torque, illustrated in FIG. 10, is substantially greater than that of this embodiment of the invention. Also, it will be seen that the counter EMF curve of FIG. 11 is nowhere near as smooth as Applicants' as shown in FIG. 7.

Figure 1:
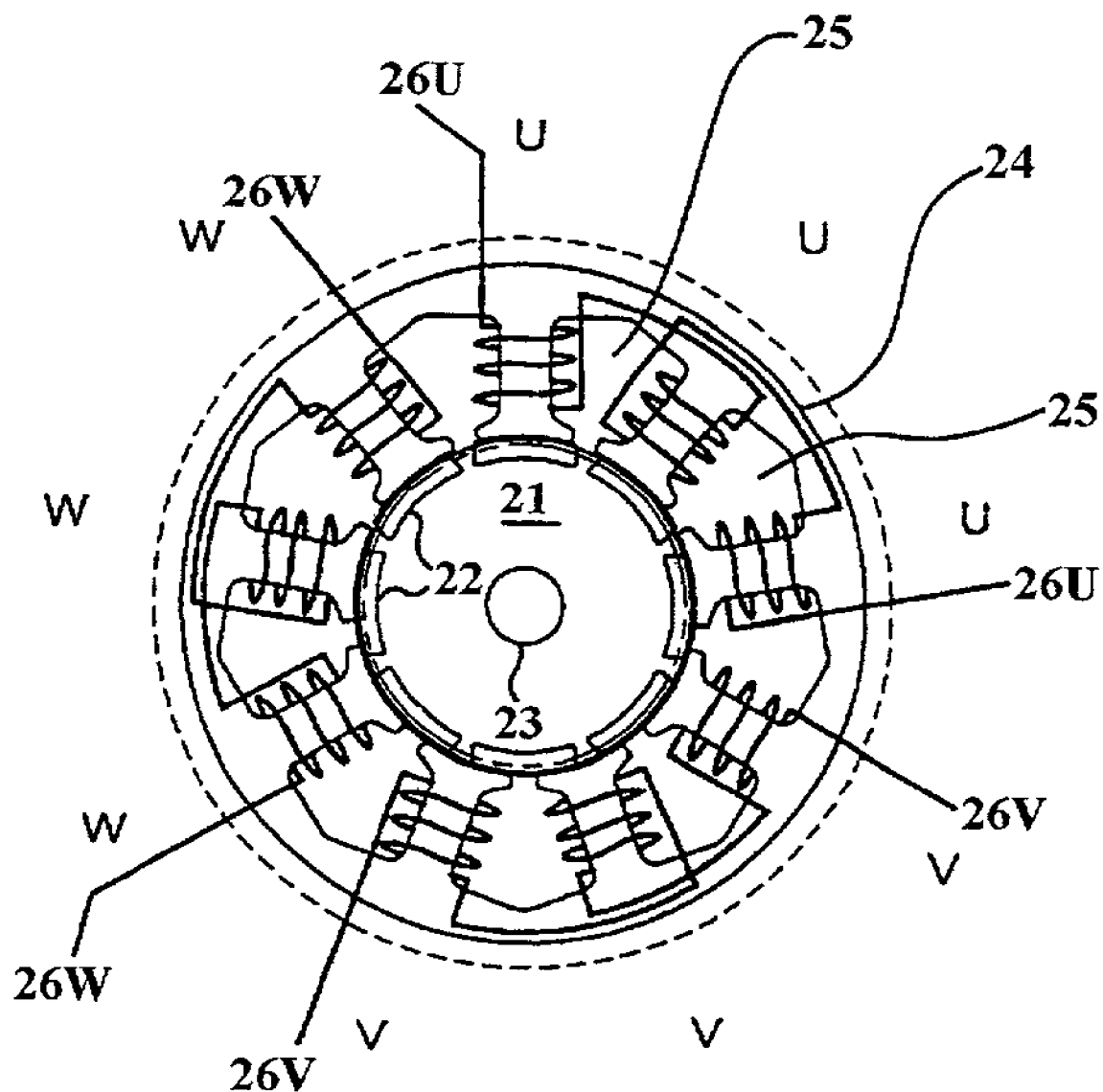
FIG. 1 is a partially schematic view of a rotating electrical machine constructed in accordance with the prior art type of construction.
Figure 4:
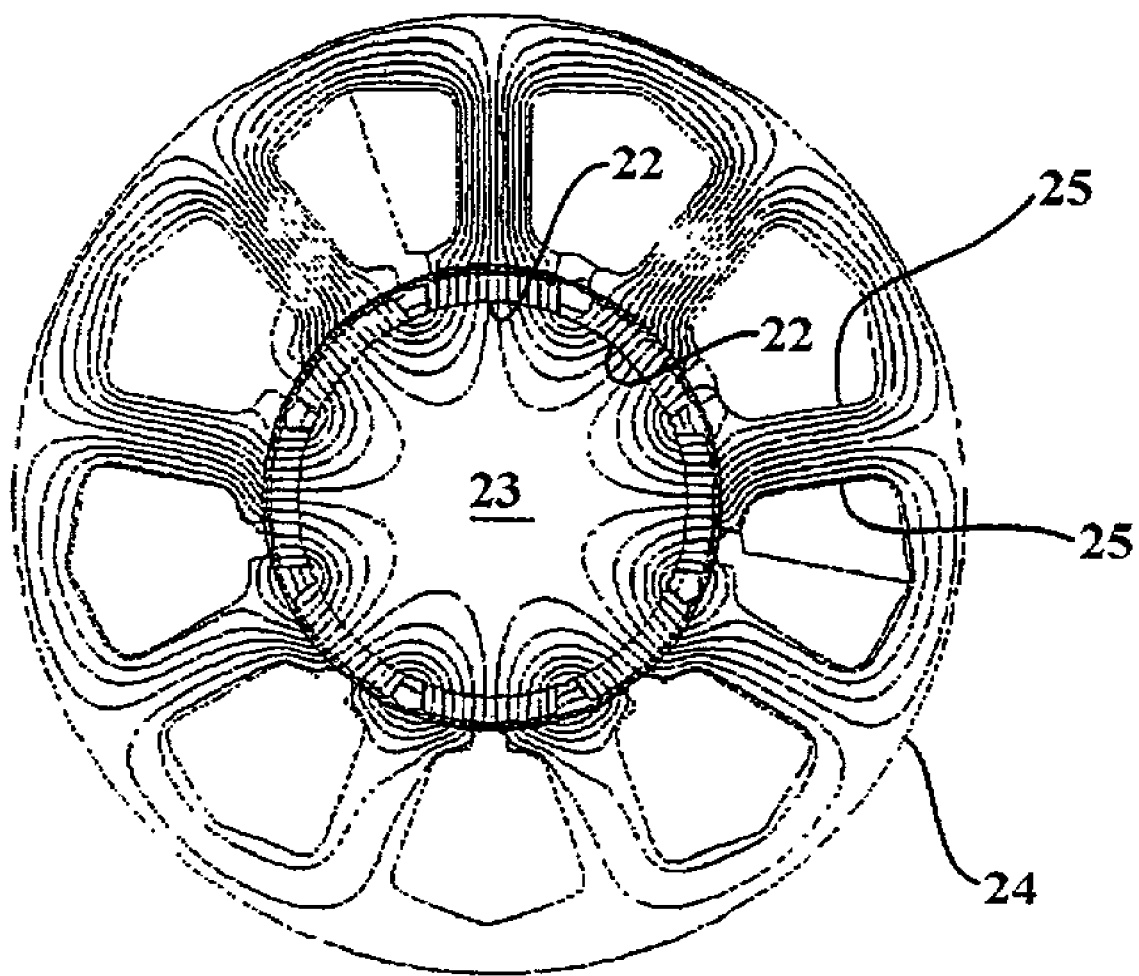
FIG. 4 is a view looking in the same direction as FIG. 1 of the prior art construction and shows the magnetic flux lines.
Figure 12:
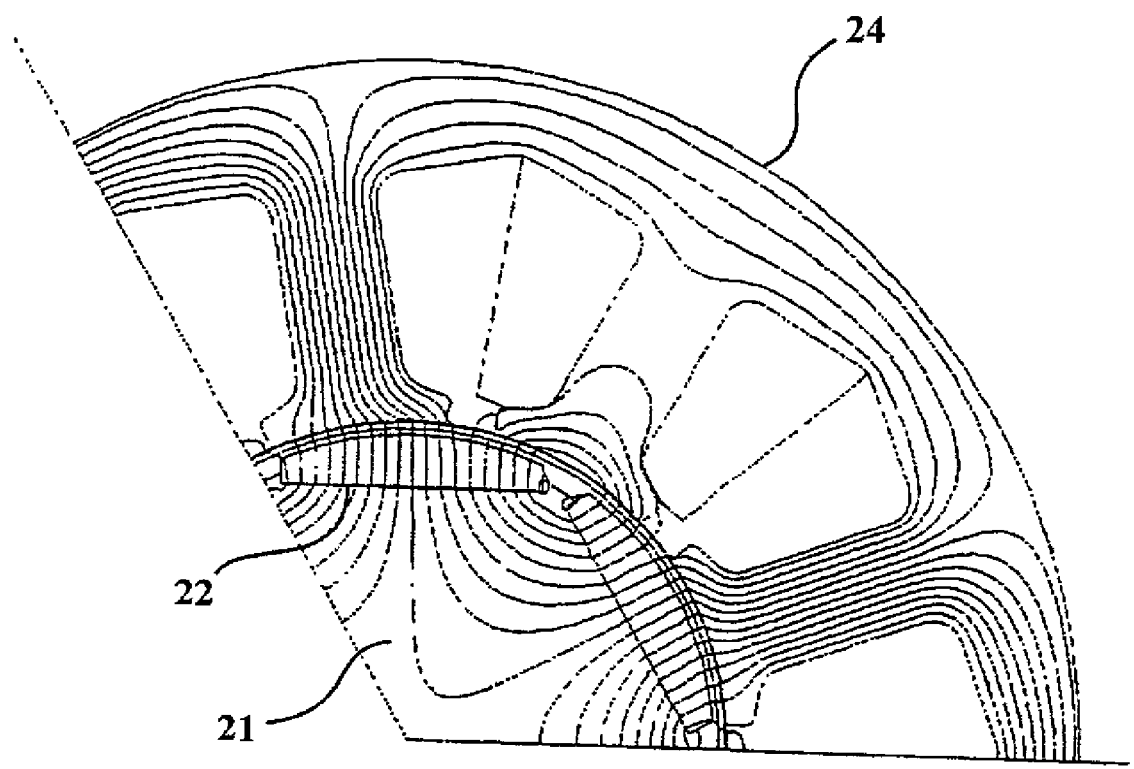
FIG. 12 is a graphical view showing the flux lines in this prior art arrangement.
Figure 13:
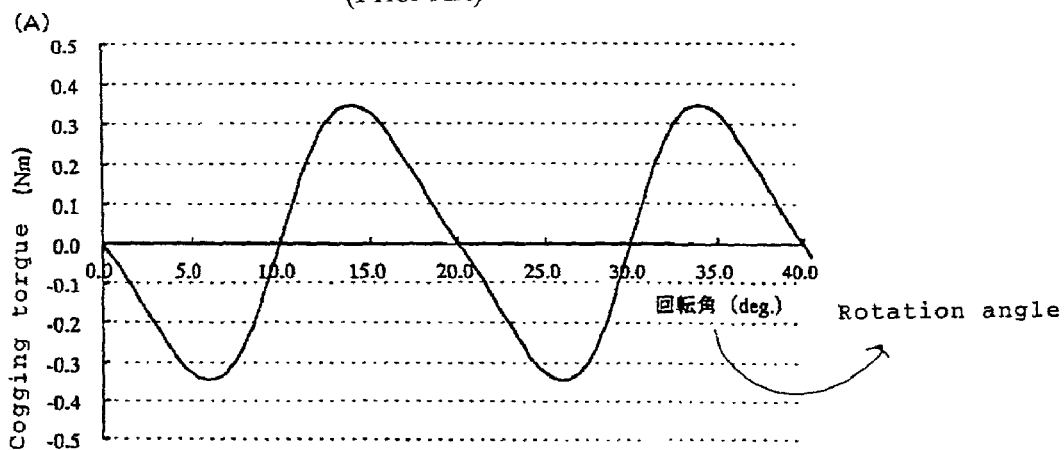
FIG. 13 is a graphical view is a graphical view showing the cogging torque in neutron meters per degree of angle of rotation of the rotor with another prior art construction.
Figure 14:
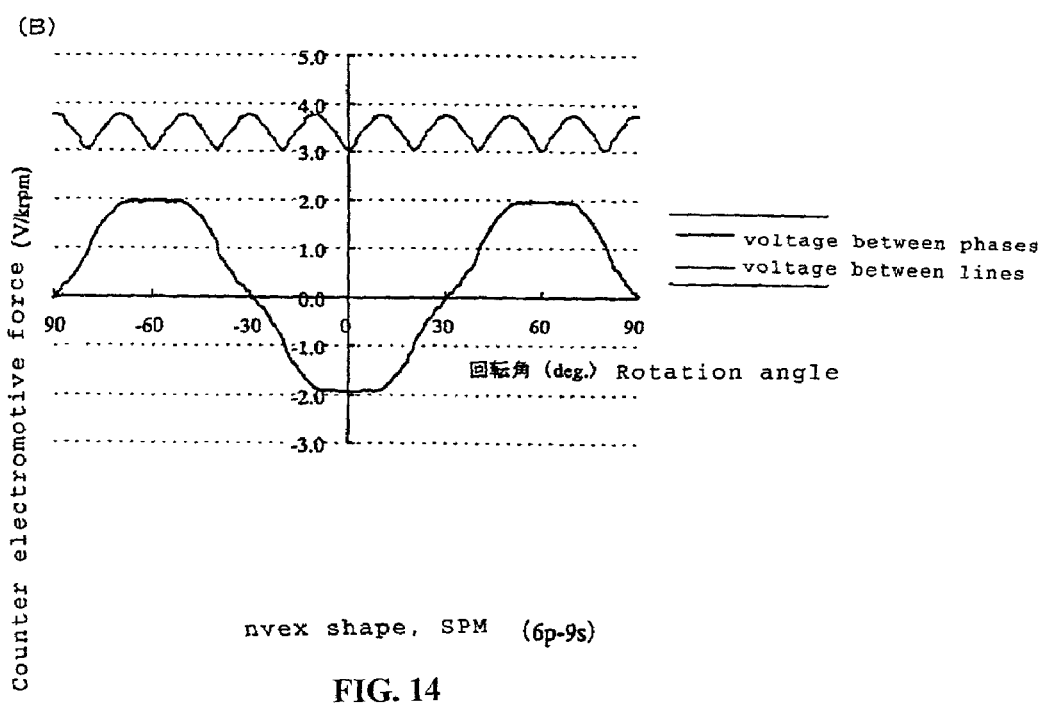
FIG. 14 is a graphical view showing the counter electromotive force in relationship to rotational angle both with respect to the phases and the individual coil winding lines of this other prior art type of construction.

FIGS. 12–4 are similar to FIGS. 9–11 but show the magnetic flux, cogging torque and counter EMF of convex shaped magnets indicated as 22 in FIG. 12. Again, it will be seen that the cogging torque is substantially higher than with the invention while the wave output is much more irregular.

Figure 15:
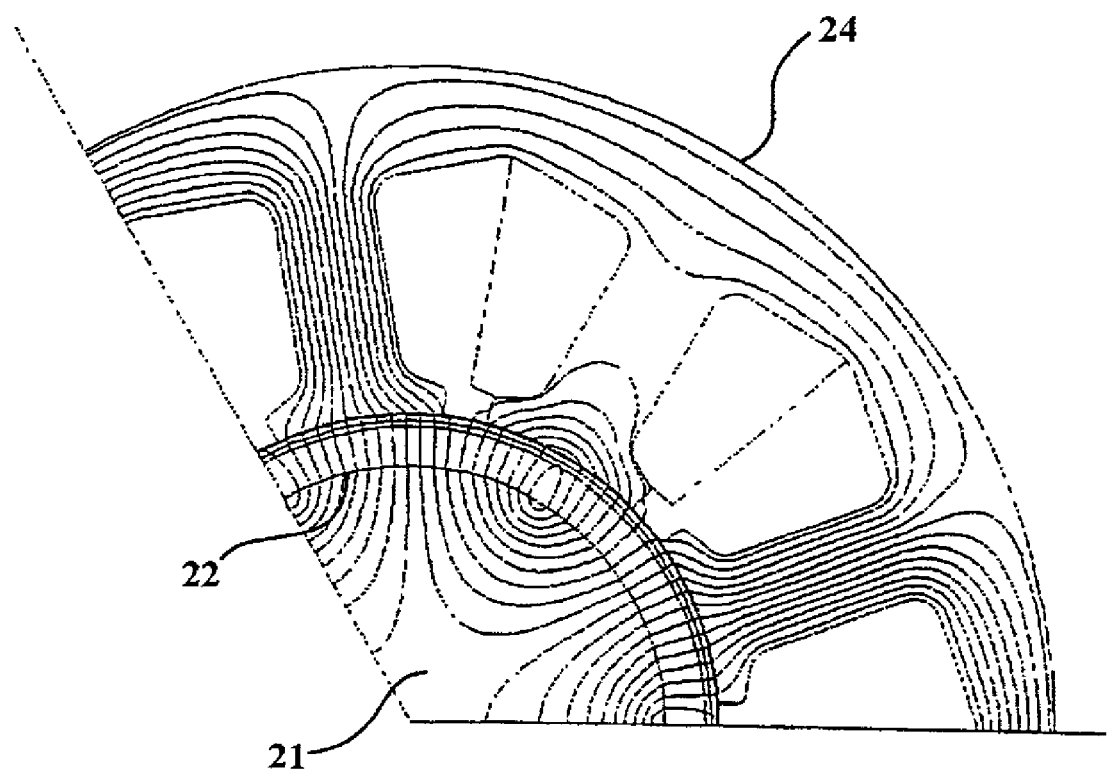
FIG. 15 is a view showing the flux lines of still another prior art construction
Figure 16:
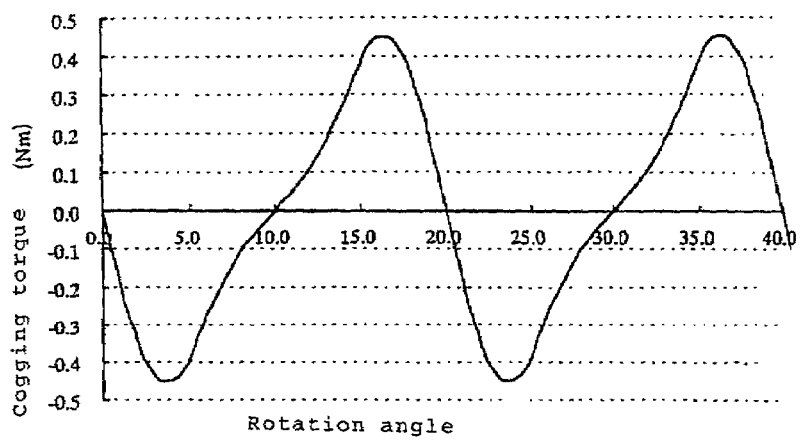
FIG. 16 is a graphical view showing the cogging torque in neutron meters per degree of angle of rotation of the rotor with this still another prior art construction.
Figure 17:
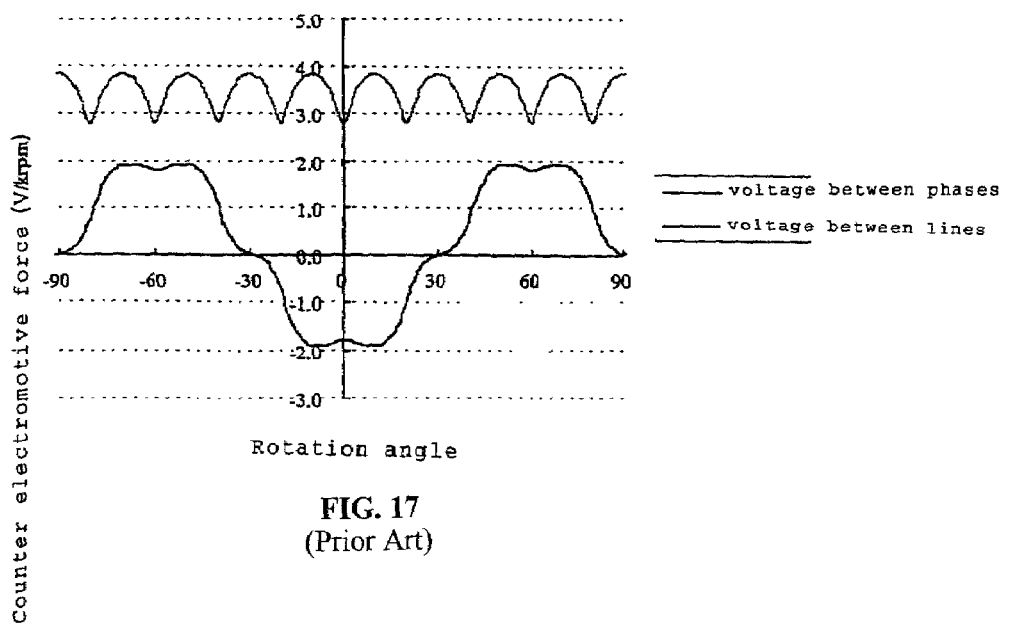
FIG. 17 is a graphical view showing the counter electromotive force in relationship to rotational angle both with respect to the phases and the individual coil winding lines of this still another prior art type of construction.

FIGS. 15–17 show the flux lines, cogging torque and counter electromagnetic forces, respectively, of an arrangement utilizing a radial ring type SPM magnet construction. Again, the cogging torque is substantially increased over Applicants' invention and the counter EMF is much more irregular.

Figure 18:
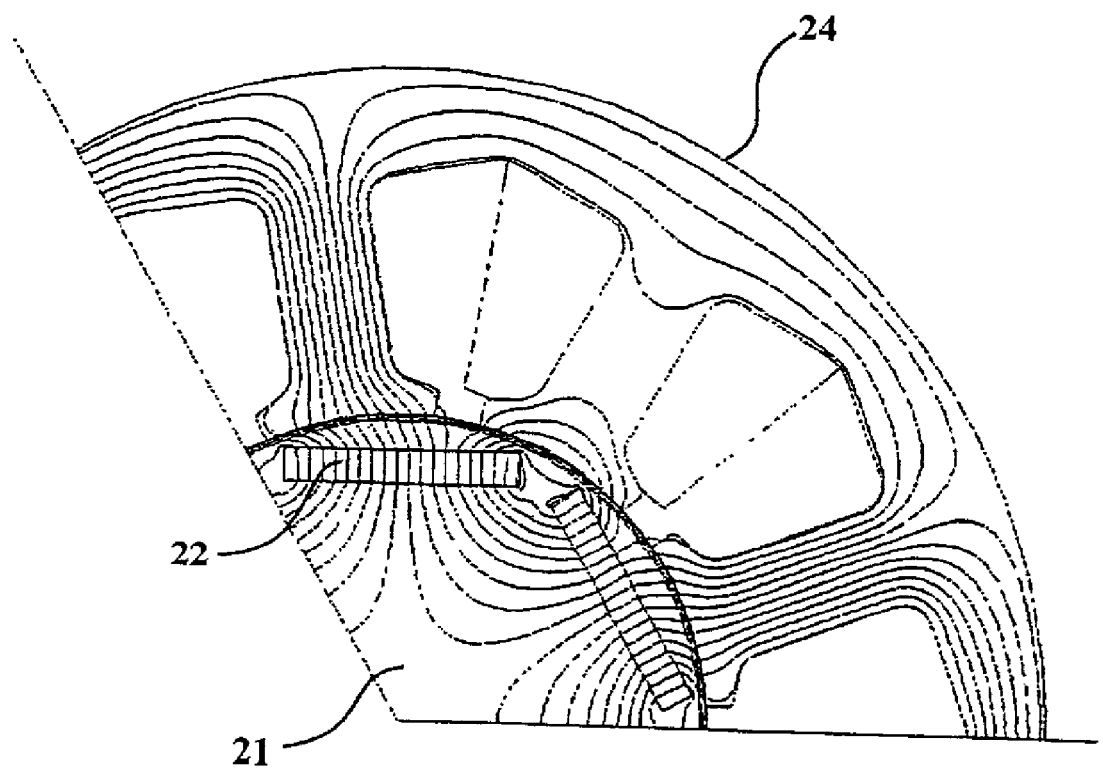
FIG. 18 is a graphical view showing the flux lines in yet another prior art arrangement.

FIGS. 18–20 show the magnetic flux lines, cogging torque and counter EMF when conventional plate-type SPM magnets are utilized, indicated by the reference numeral 22 in the drawings. Again, the results clearly indicate the superiority of the construction in accordance with the invention.

Figure 21:
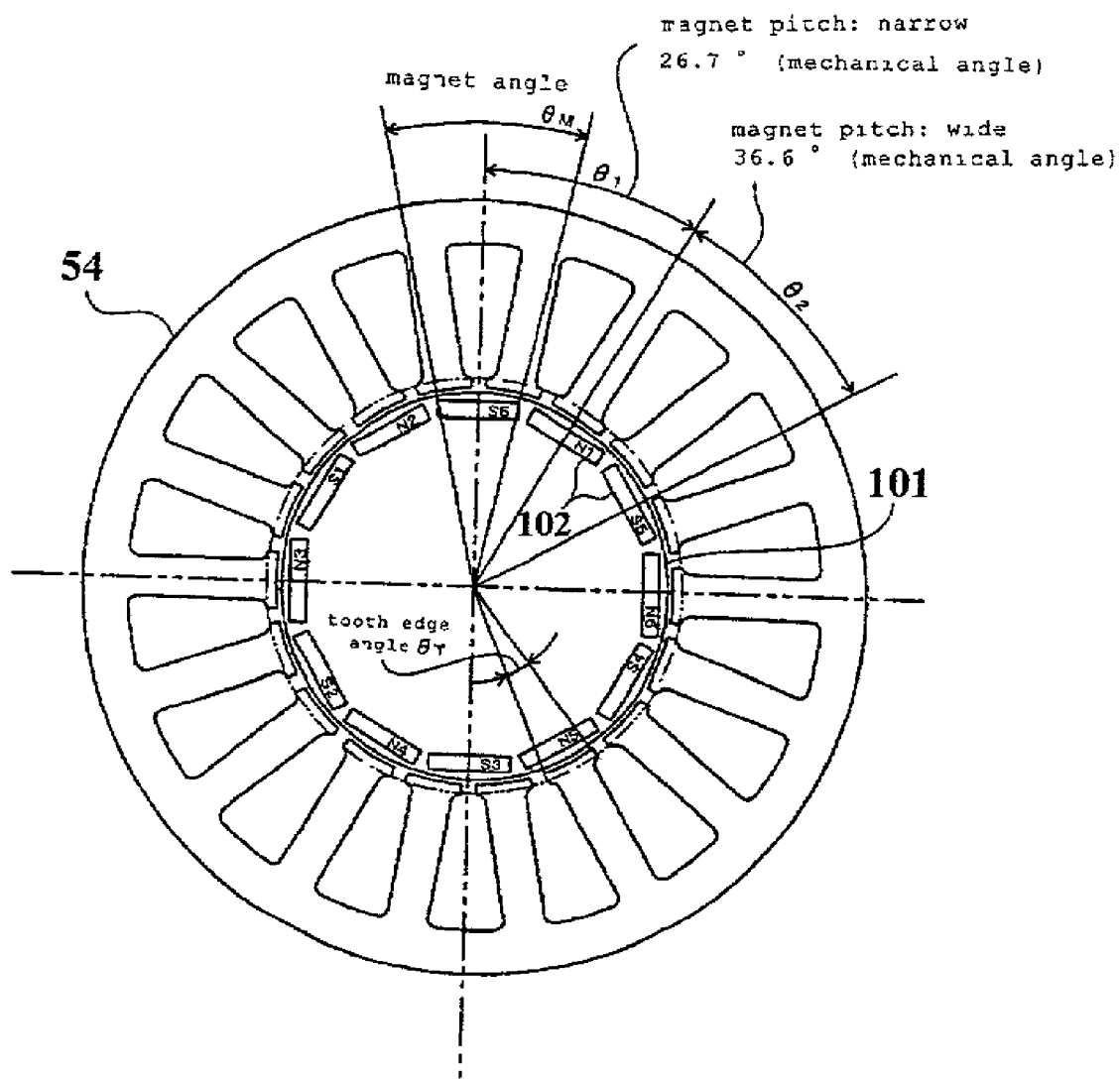
FIG. 21 is a view, in part similar to FIG. 5, and shows another embodiment of the invention.
Figure 22:
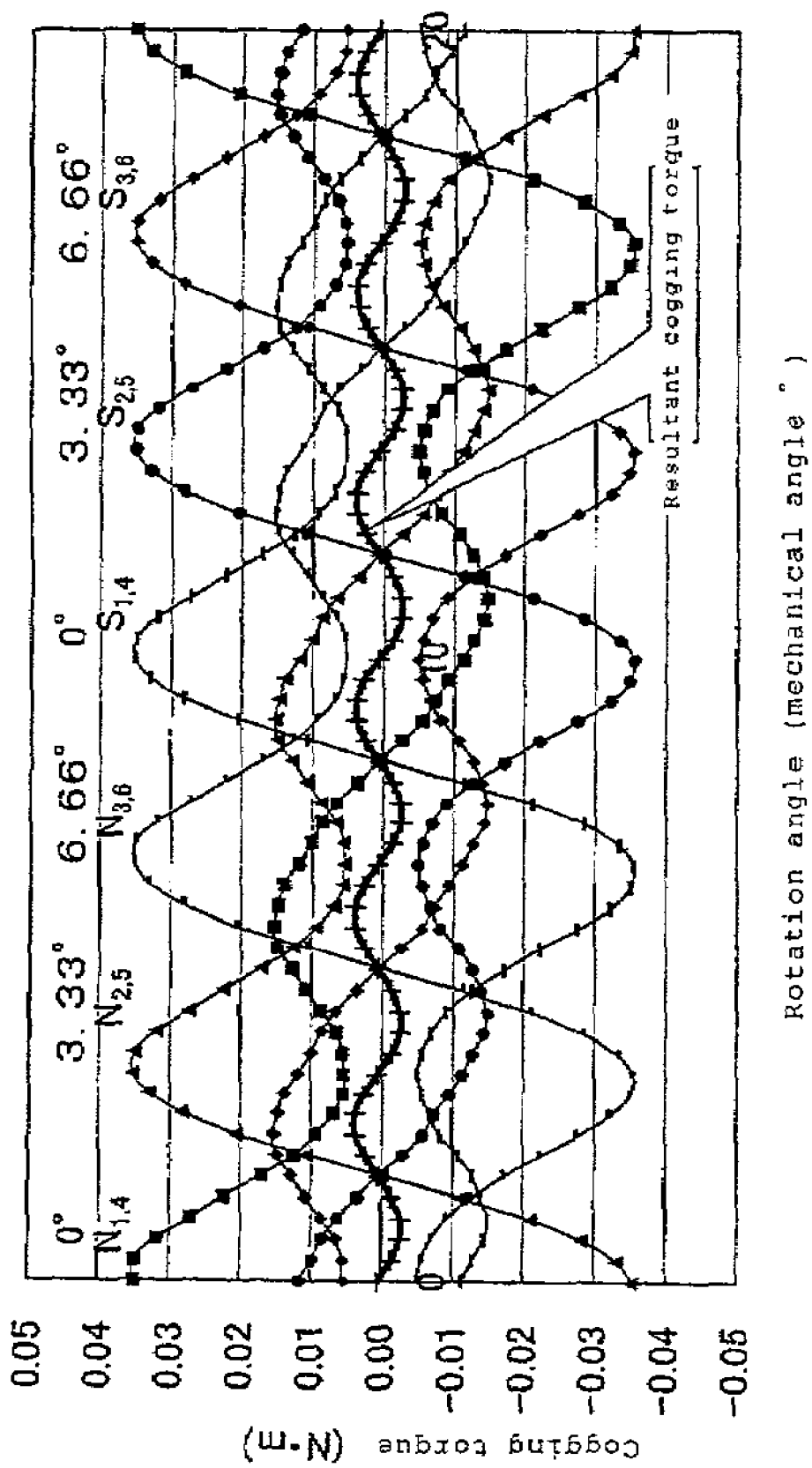
FIG. 22 is a graphical view showing the cogging torque in connection with rotational angle for this other embodiment of the invention.
Figure 23:
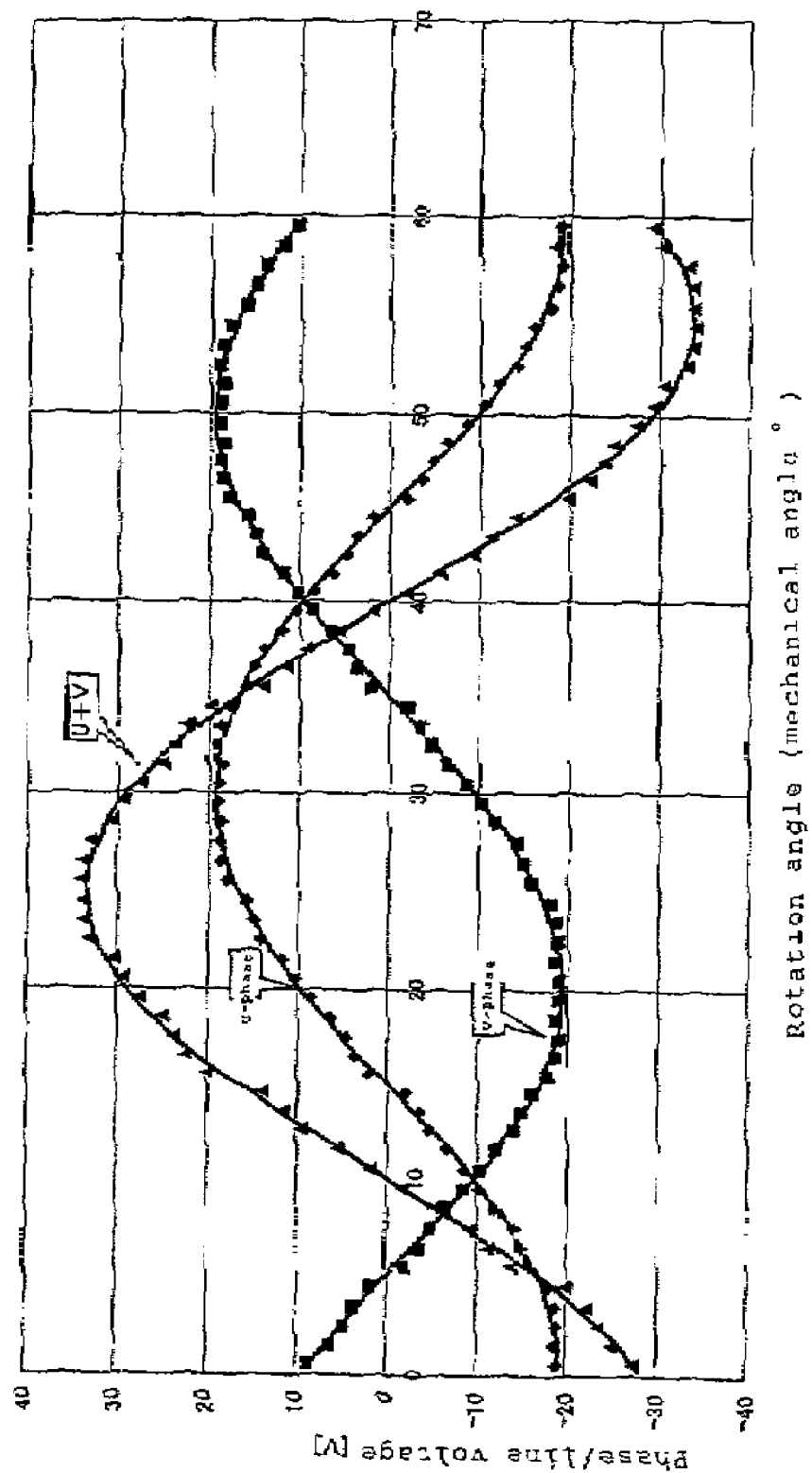
FIG. 23 is a graphical view showing the phase line voltage output in response to rotational angle for this other embodiment.

FIGS. 21–23 shows another embodiment of the invention. In this embodiment, a rotor 101 has twelve permanent magnets of the plate-type arranged in alternating plurality. These permanent magnets are indicated by the reference numeral 102 and their plurality appears in FIG. 21. These permanent magnets 102 are disposed in groups of three with the permanent magnets in each group of three being spaced so that there is a narrow angular gap of 26.7° between the two magnets of the group and a wider pitch of 36.6° between the remaining magnet and the center magnet of the group. In this embodiment, the angle of each magnet is the same and this indicated at $\Theta$ $\Theta$ $\Theta$.

These particulars angles were determined by utilizing computer software named "Maxwell 2D Field Simulator", which is available from Ansoft-Japan Co., Ltd, whose main office is located at 3-18-20 Shin Yokahama, Kitaku, Yokahama-shi, Kanigawa-ken, Japan. This software permits calculation of the torque exerted on a part at its specific location. Optimum pitch angles are computed for the angles $\Theta 1$ and $\Theta° 2$ by determining repeated calculations with varying pitch angles.

The pitch angle $\theta 1=26.7$ is a pitch angle $\theta 0=30°$, for regularly disposed magnets, offset by 3.3° (mechanical angle), therefore this angle 3.3° is referred to as an offset angle $\theta D$. The value of the pitch angle $\theta 2$ is necessarily 33.6° when the pitch angle $\theta 1=26.7°$.

The torques exerted on permanent magnets 102 when the offset angle $\theta D=3.3°$ and the rotor 101 is rotated without currents in coils, are shown in FIG. 22. Since torques exerted on the magnets N1 and N4 (see FIG. 21) are the same because of the symmetry of the machine, N1,4 represents the sum of these torque values. Likewise, N3,6 and N2,5 represent the sum of torque values of magnets N3, N6 and the sum of torque values of magnets N2, N5, respectively. Also, S1,4, S3,6 and S2,5 represent the sum of torque values of the magnets S1, S4, the magnets S3, S6, and the magnets S2, S5, respectively. The horizontal axis of FIG. 22 represents the rotation angle (mechanical angle) of the rotor 101.

As is clear from FIG. 22, if the offset angle $\theta D=3.3°$, a phenomenon occurs in which the peak of the sum of torque values of one set of magnets is cancelled by the bottom of the sum of torque values of another set of magnets. For example, the peak of the torque of N1,4 is cancelled by the bottom of the torque of N2,5. As a result, when all the torque values are summed up, the total torque, that is, the resultant cogging torque becomes very small as shown in FIG. 22 by a heavy line. This total torque is the cogging torque when the rotor 101 is rotated without drive currents in coils.

This cogging torque has three peaks in the length of time the rotor 101 rotates through an angle of 10°. In other words, 108 peaks will appear for one rotation (360°) of the rotor 101, so that the cogging number amounts to 108. This machine has eighteen slots (S=18) and twelve poles (P=12), so that the least common multiple of these numbers is 36. Therefore, it can be seen that the cogging number is three times the least common multiple 36, that is, 3×36=108.

Figure 24:
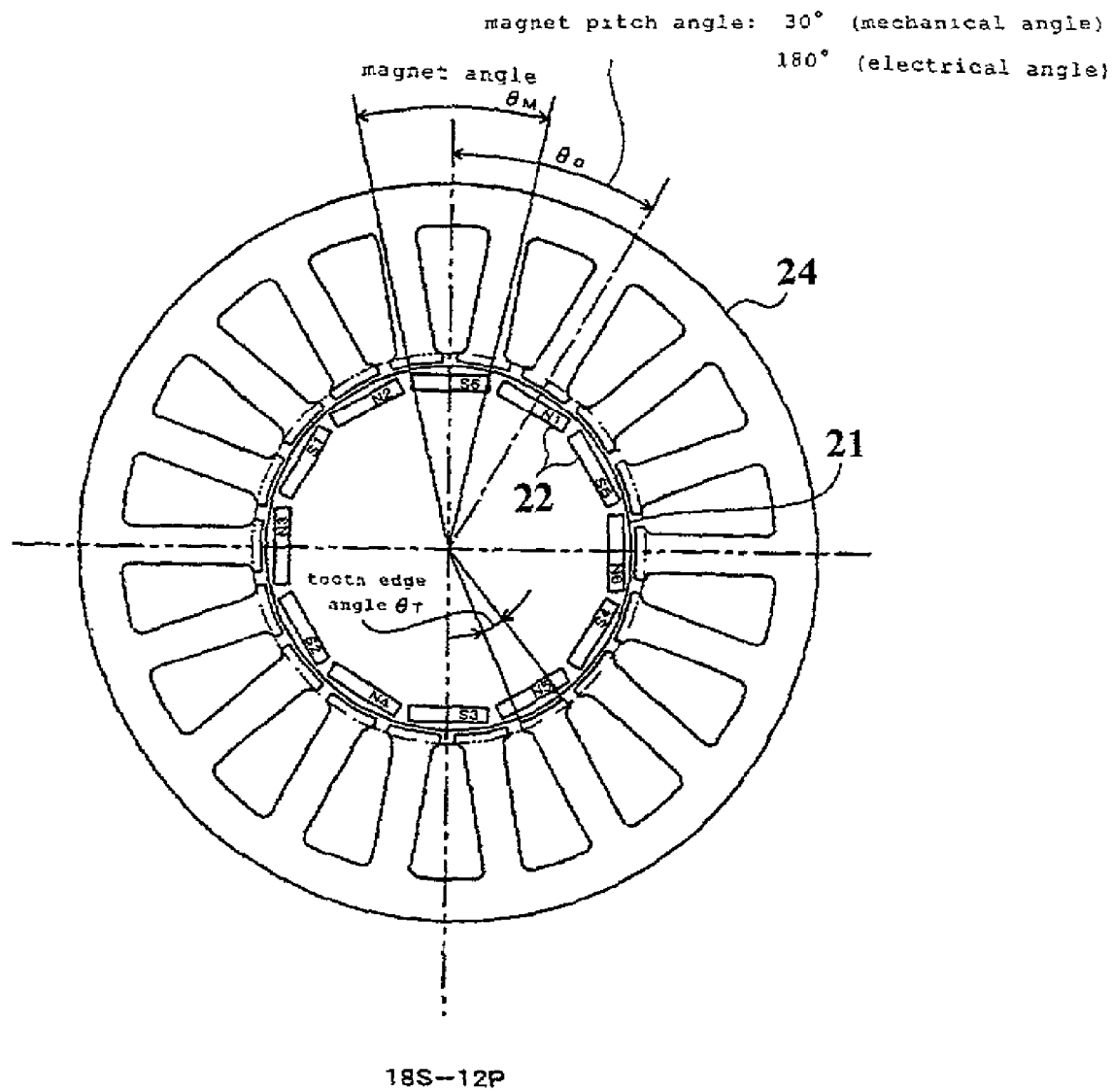
FIG. 24 is a view, in part similar to FIG. 21, but shows a conventional prior art type of construction.
Figure 25:
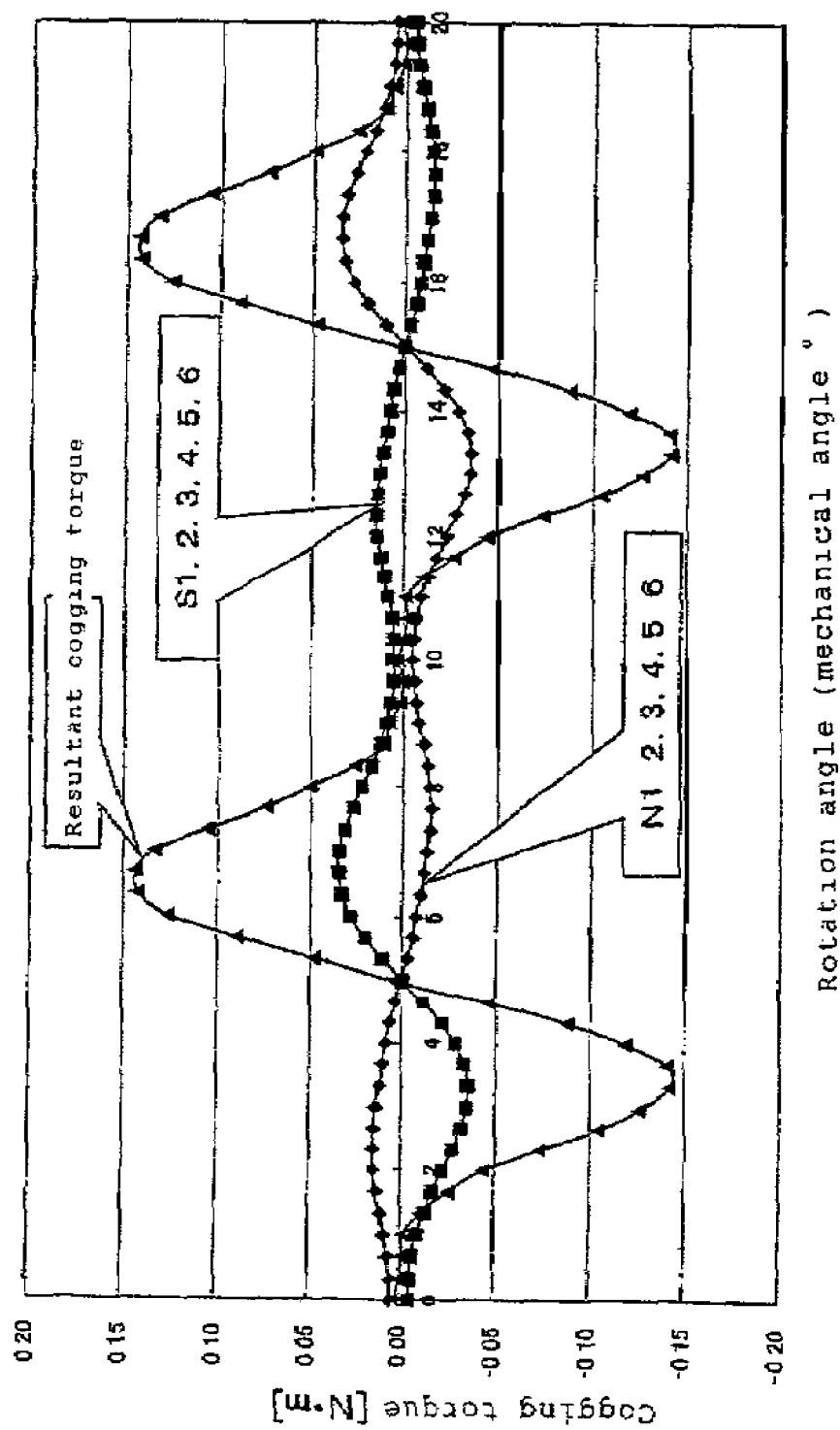
FIG. 25 is a graphical view, in part similar to FIG. 22, and shows the cogging torque for this conventional art for comparison with that of FIG. 22.

The advantages of this construction will become apparent when compared with a prior art type machine in which the permanent magnets 22 of the rotor 21 are disposed at regular intervals as shown in FIG. 24. FIG. 25 is a graph showing the torque exerted on each permanent magnet 22 and the resultant cogging torque. As seen in FIG. 24, the rotor 21 has twelve permanent magnets 22 disposed at equal pitch angles $\theta 0$ ($\theta=30°$).

Using the same computer software previously referred to FIG. 25 is obtained. The torque exerted on each magnet N1–N6 is the same in magnitude. Likewise, the torque exerted on each magnet S1–S6 is the same in magnitude but out of phase by 10° in mechanical angle from that on the magnet N1–N6. The total of these torque values or the cogging torque is six times as large as the torque value, and the resultant cogging torque takes the value shown in FIG. 25.

As is clear from FIG. 25, when the permanent magnets 22 of the rotor 21 are disposed regularly, two peaks of the cogging torque appear in a mechanical angle of 20°, resulting in thirty-six coggings per rotation of the rotor 21. Therefore, the cogging torque determined from the reciprocal of a square of the cogging number is increased, as previously described.

Figure 26:
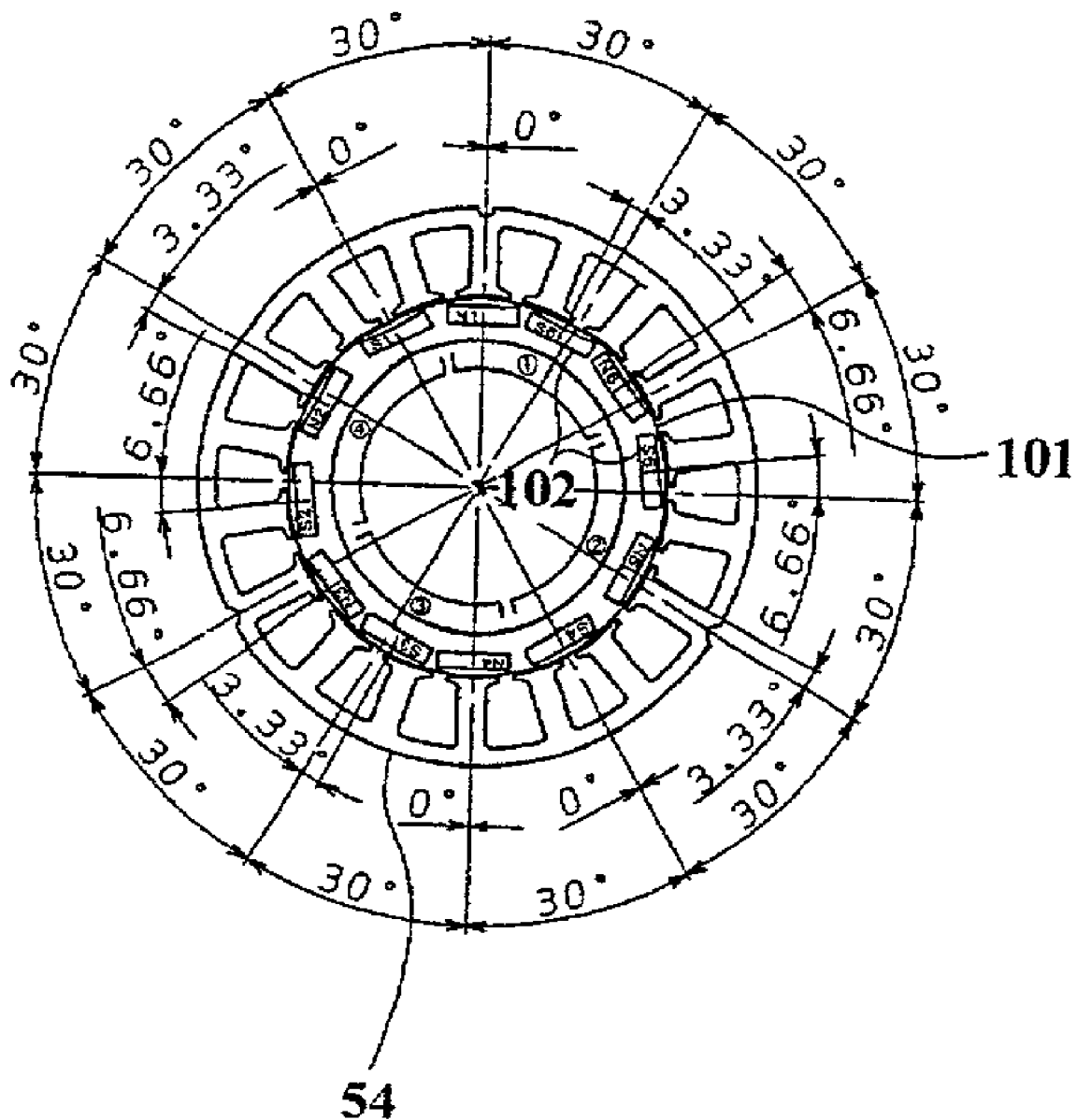
FIG. 26 is a view, in part similar to FIGS. 5 and 21, and shows another embodiment of the invention

FIG. 26 is a view showing the construction of another embodiment of this invention. Similar components are identified by the same reference numerals as previously applied. In this embodiment the rotating electrical machine is provided with eighteen slots 55 (S=18) and twelve magnetic poles 102 (P=12). The stator 54 of the machine has eighteen magnetic pole teeth 56 disposed at regular intervals.

On the circumferentially disposed magnetic pole teeth are wound U, V and W phase coils in the same order as in FIG. 8. Here, all the magnetic pole teeth 56 have the same circumferential pitch angle. That is, the magnetic pole teeth 56 are disposed circumferentially at regular intervals.

The rotor 101 has twelve permanent magnets 102. As in FIG. 21, the permanent magnets 102 are marked with symbols of S1–S6 and N1–N6 and numerals indicative of their positions. The permanent magnets 102 are arranged such that three permanent magnets constitutes one set and total of four sets are disposed in the circumferential direction. That is, the first set is constituted by N1, S6 and N6, the second set by S5, N5 and S4, the third set by N4, S3 and N3, and the fourth set by S2, N2 and S1.

The circumferential pitch angle of the permanent magnets N1, S6, N6, N4, S3 and N3 within two sets are at a symmetrical positions relative to each other. For example, the first and the third set, spacing is 26.7°. That is, since the pitch angle (reference pitch angle) of regularly disposed permanent magnets 102 is 360°/12=30°, with N1 and N4 as reference magnets, the angle between N1 and the adjacent S6, and the angle between N4 and the adjacent S3, are each made smaller than the reference pitch angle of 30° by 3.33° to 30.00°−3.33°=26.67°. Likewise, offset angles of S6 and S3 from their reference positions are each 6.66°.

The pitch angle of the permanent magnets S5, N5, S4, S2, N2 and S1 within the other sets (the second and the fourth set) at a symmetrical position is 33.3°. The pitch angle of adjacent two permanent magnets between adjacent different sets is 30° That is, the pitch angle between the permanent magnets N6 and S5, the pitch angle between S4 and N4, the pitch angle between N3 and S2, and the pitch angle between S1 and N1, are each 30°.

As a result of a computer numerical analysis in this embodiment like that in the foregoing embodiment, it was found that the cogging number is 108. That is, the cogging number proved to be three times the least common multiple (36) of the number S=18 of slots and the number P=12 of poles.

Figure 27:
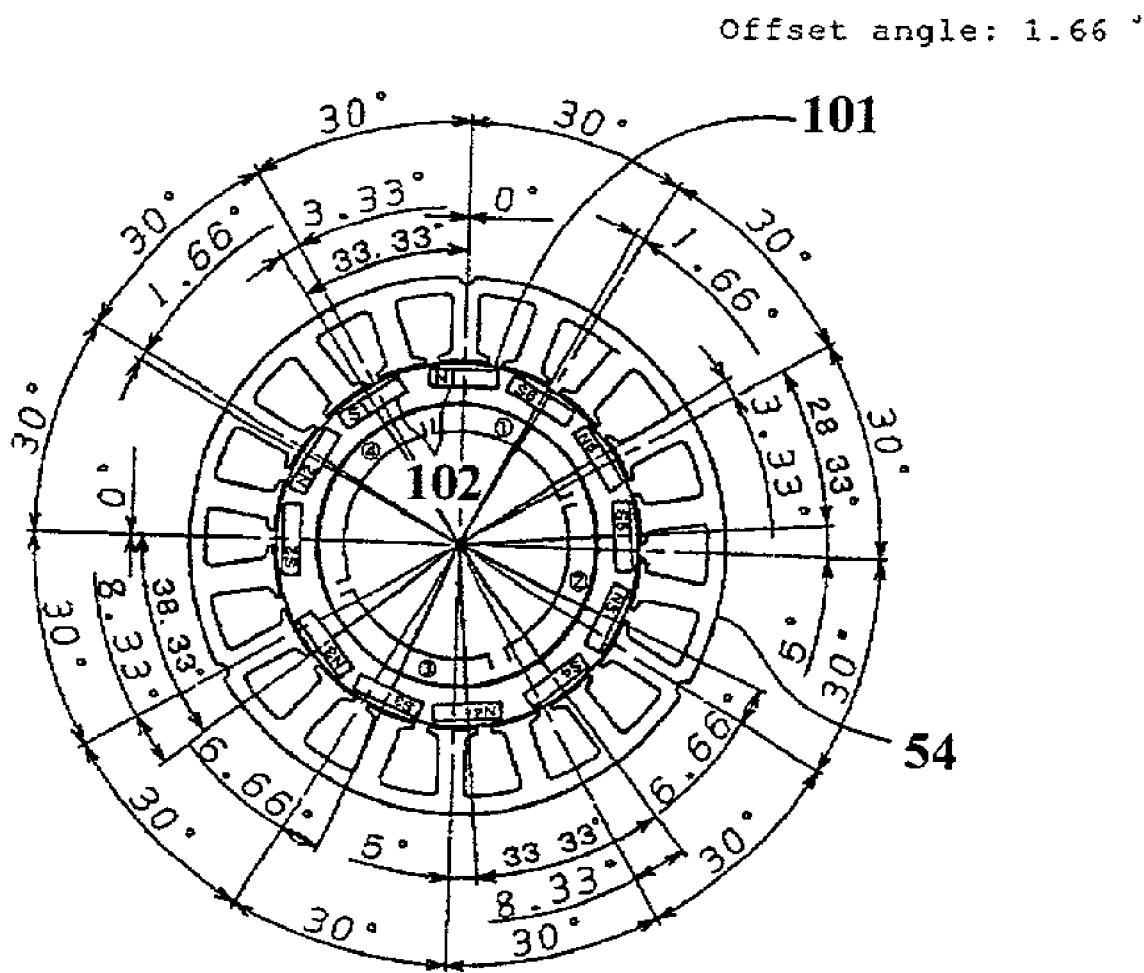
FIG. 27 is a view, in part similar to FIGS. 5, 21 and 26, and shows a yet further embodiment of the invention.
Figure 28:
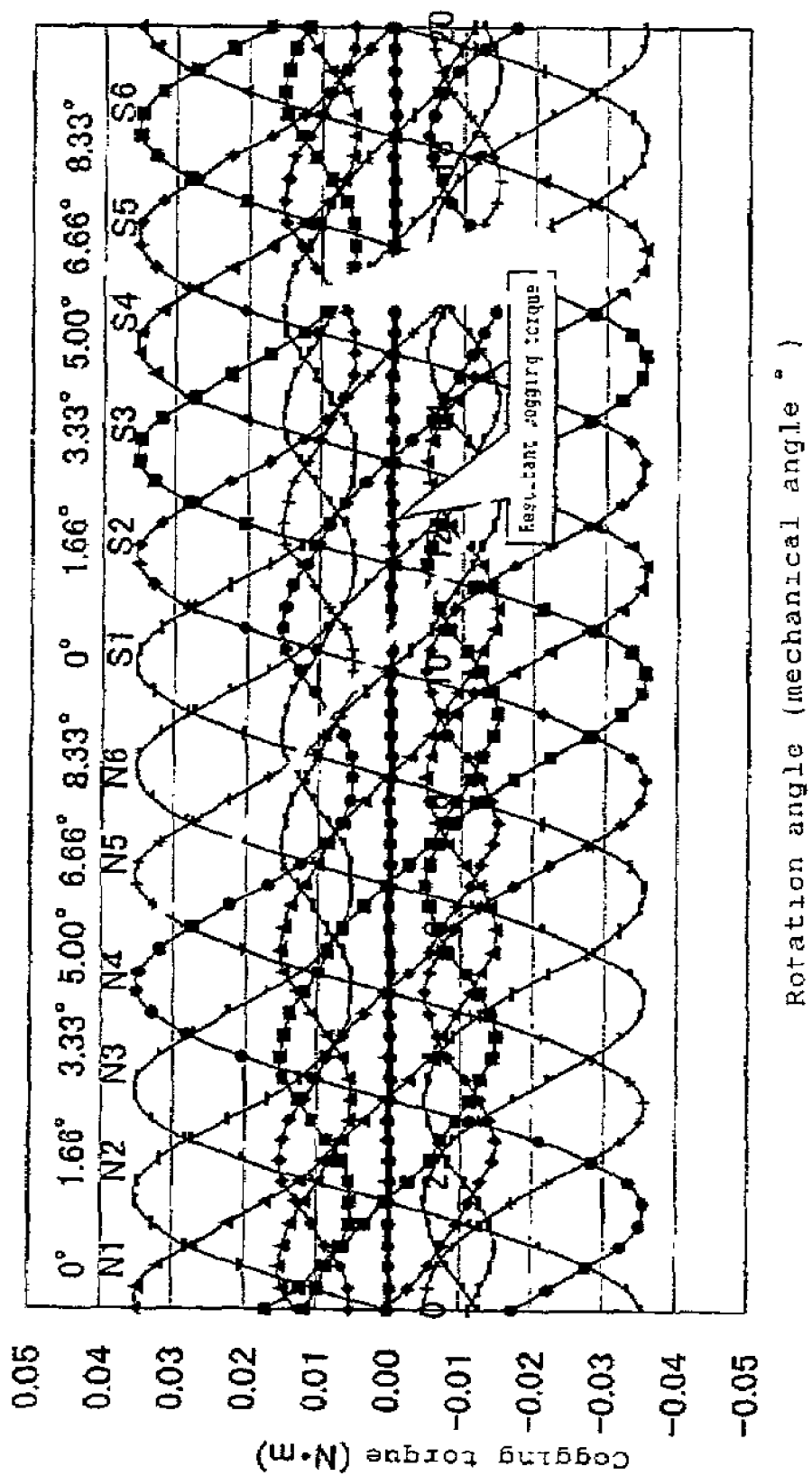
FIG. 28 is a graphical view showing the cogging torque of this yet further embodiment.

FIG. 27 is a view showing the construction of still another embodiment of this invention. FIG. 28 is a graph showing the torque exerted on each permanent magnet and the resultant cogging torque of this embodiment. This embodiment is exemplified by a motor or generator with eighteen slots and twelve poles, a stator 101 being the same as the one shown in FIG. 21.

Its rotor 101 has twelve permanent magnets 102. As in FIG. 21, the permanent magnets 102 are marked with symbols of S1–S6 and N1–N6 and numerals indicative of their positions. The permanent magnets 102 are arranged such that three permanent magnets constitute one set and total of four sets are disposed in the circumferential direction. That is, the first set is constituted by N1, S6 and N6, the second set by S5, N5 and S4, the third set by N4, S3 and N3, and the fourth set by S2, N2 and S1.

In this embodiment, the circumferential pitch angle of the three magnets in each set is constant 28.3°. However, pitch angles between sets are different. The angle between the first and the second set (angle between magnets N6 and S5) is 33.3°, the angle between the second and the third set (angle between magnets S4 and N4) is 28.3°, the angle between the third and the fourth set (angle between magnets N3 and S2) is 33.3°, and the angle between the fourth and the first set (angle between magnets S1 and N1) is 38.3°.

As a result of the aforenoted computer analysis for this embodiment, the torque exerted on each magnet and the resultant cogging torque are calculated and shown in FIG. 28. That is, the cogging number is 216. This number is six times the least common multiple of the number S=18 of slots and the number P=12 of poles. Thus, the cogging number is doubled compared with the foregoing embodiment of FIG. 26, so that it can be seen that smoother rotation will be provided.

Since the permanent magnets 102 are disposed irregularly in this embodiment, balancing weights are preferably attached for compensation to the rotor 101 in the circumferential direction. In addition, angles between permanent magnets suggested in the foregoing embodiments need not be exact, and the intended effect can be produced with angles slightly different from the angles herein suggested, therefore the slightly different angles are also included in this invention. Various other changes and modifications are possible without departing from the spirit and scope of the invention as defined by the appended claims.

The invention claimed is:

1. A permanent magnet rotary electric machine having a rotor and a stator, one of said rotor and said stator comprising a plurality of permanent magnets disposed such that polarities of adjacent magnets are different from each other, the other of said rotor and said stator comprising a plurality of electrical coils wound around cores juxtaposed to said permanent magnets for cooperation therewith, said coil windings being arranged in groups of coil windings, the coil windings of said groups having their windings connected to each other and common ends, no two coil windings of each group being circumferentially adjacent to the other, all said permanent magnets being of substantially of the same shape with a circumferential offset angle of each permanent magnet from a regularly disposed position being set such that a cogging number per rotation of the rotor is equivalent to as the least common multiple of the number S of slots between the electrical winding cores and the number P of magnetic poles and one of said cores and said permanent magnets being disposed in nonsymmetrical relation to the axis of rotation of said machine.

2. A permanent magnet rotary electric machine as set forth in claim 1, wherein the number S of slots is eighteen, the number P of magnetic poles is twelve, and the twelve permanent magnets are divided into four sets, each set comprising three circumferentially adjacent permanent magnets, the circumferential pitch angle of the three permanent magnets of each set is 26.70°, and the circumferential pitch angle of adjacent two permanent magnets between the sets is 36.60°.

3. A permanent magnet rotary electric machine as set forth in claim 1, wherein the number S of slots is eighteen, the number P of magnetic poles is twelve, and the twelve permanent magnets are divided into four sets, two of said four sets comprising three circumferentially adjacent permanent magnets, the circumferential pitch angle of the three permanent magnets of each set is 26.7°, and the circumferential pitch angle of permanent magnets within the other two sets disposed at a symmetrical position is 33.3°.

4. A permanent magnet rotary electric machine as set forth in claim 1, wherein the number S of slots is eighteen, the number P of magnetic poles is twelve, and the twelve permanent magnets are divided into four sets of three circumferentially adjacent permanent magnets, the circumferential pitch angle of the three permanent magnets of each set is 28.3°, and circumferential pitch angles of adjacent permanent magnets between adjacent different sets are set to 33.3°, 28.3°, 33.3° and 28.3° circumferentially in this order.

5. A permanent magnet rotary electric machine having a rotor and a stator, one of said rotor and said stator comprising a plurality of permanent magnets disposed such that polarities of adjacent magnets are different from each other, the other of said rotor and said stator comprising a plurality of electrical coils wound around cores juxtaposed to said permanent magnets for cooperation therewith, said coil windings being arranged in groups of coil windings, the coil windings of said groups having their windings connected to each other and common ends, no two coil windings of each group being circumferentially adjacent to the other, wherein the magnitude of the torque exerted on each permanent magnet is determined separately by a computer numerical analysis and peaks or bottoms of the torque curves of said permanent magnets are offset from each other with respect to the rotation angle of the rotor so that the cogging number is increased.

* * * * *